(12) United States Patent
He et al.

(10) Patent No.: US 10,693,785 B2
(45) Date of Patent: Jun. 23, 2020

(54) METHOD AND SYSTEM FOR FORWARDING DATA, VIRTUAL LOAD BALANCER, AND READABLE STORAGE MEDIUM

(71) Applicant: Ping An Technology (Shenzhen) Co., Ltd., Shenzhen, Guangdong (CN)

(72) Inventors: Taotao He, Guangdong (CN); Renjie Yi, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/306,550

(22) PCT Filed: Jun. 22, 2017

(86) PCT No.: PCT/CN2017/089481
§ 371 (c)(1),
(2) Date: Nov. 30, 2018

(87) PCT Pub. No.: WO2018/184302
PCT Pub. Date: Oct. 11, 2018

(65) Prior Publication Data
US 2019/0173790 A1     Jun. 6, 2019

(30) Foreign Application Priority Data
Apr. 6, 2017 (CN) .......................... 2017 1 0227252

(51) Int. Cl.
*H04L 12/741* (2013.01)
*H04L 12/803* (2013.01)
(Continued)

(52) U.S. Cl.
CPC ........ *H04L 45/745* (2013.01); *H04L 12/4641* (2013.01); *H04L 45/22* (2013.01);
(Continued)

(58) Field of Classification Search
CPC ..... H04L 45/745; H04L 45/22; H04L 47/125; H04L 12/4641; H04L 67/1002
See application file for complete search history.

(56) References Cited

U.S. PATENT DOCUMENTS

2007/0250836 A1* 10/2007 Li ........................ G06F 9/505
                                                                       718/105
2011/0251992 A1* 10/2011 Bethlehem ......... H04L 12/2863
                                                                         707/610
(Continued)

FOREIGN PATENT DOCUMENTS

CN    101252591 A    8/2008
CN    101841464 A    9/2010
(Continued)

OTHER PUBLICATIONS

International Search Report of PCT Patent Application No. PCT/CN2017/089481 dated Jan. 8, 2018.

*Primary Examiner* — Jamal Javaid

(57) ABSTRACT

Disclosed are a method and a system for forwarding data, as well as a virtual load balancer and a readable storage medium. The method for forwarding data includes: sending the pending response data packet to the real server RS through a rear terminal sub interface, when the virtual load balancer VLB receives a pending response data packet sent by the Linux virtual server LVS from a front terminal sub interface, wherein the forward network port of the VLB corresponds to at least one front terminal sub interface, and a front terminal sub interface corresponds to a carrier's data interface; and the RS receives and responds to the pending response data packet, getting a response data packet and sending the response data packet to the VLB from the rear terminal sub interface; and the VLB receives the response data packet.

12 Claims, 3 Drawing Sheets

(51) Int. Cl.
 *H04L 12/46* (2006.01)
 *H04L 29/08* (2006.01)
 *H04L 12/707* (2013.01)
 *H04L 12/743* (2013.01)

(52) U.S. Cl.
 CPC ........ *H04L 45/7453* (2013.01); *H04L 47/125* (2013.01); *H04L 67/1002* (2013.01)

(56) References Cited

U.S. PATENT DOCUMENTS

| | | |
|---|---|---|
| 2014/0149981 A1 | 5/2014 | Luxenberg et al. |
| 2015/0146539 A1 | 5/2015 | Mehta et al. |

FOREIGN PATENT DOCUMENTS

| | | |
|---|---|---|
| CN | 102110014 A | 6/2011 |
| CN | 102436401 A | 5/2012 |
| CN | 102523302 A | 6/2012 |
| CN | 102752226 A | 10/2012 |
| CN | 103441944 A | 12/2013 |
| CN | 103546504 A | 1/2014 |
| CN | 103905534 A | 7/2014 |
| CN | 104899094 A | 9/2015 |
| CN | 106506700 A | 3/2017 |

\* cited by examiner

METHOD AND SYSTEM FOR FORWARDING DATA, VIRTUAL LOAD BALANCER, AND READABLE STORAGE MEDIUM

CROSS-REFERENCE TO RELATED APPLICATIONS

The present application is the National Stage of International Application No. PCT/CN2017/089481, filed Jun. 22, 2017, which claims the benefit of China Patent Application No. 201710227252.1, filed Apr. 6, 2017 with the State Intellectual Property Office and entitled "Method and System for Forwarding Data, Virtual Load Balancer, and Computer-readable Storage Medium", the entirety of which is hereby incorporated herein by reference.

TECHNICAL FIELD

The present disclosure relates to the field of communication technology, and more particularly relates to a method and system for forwarding data, as well as a virtual load balancer and a readable storage medium.

BACKGROUND

In the cloud platform load balancing process, multiple Virtual Private Network (VPN) routing forwarding tables are required to isolate carriers in order to achieve multi-carrier access. Each VPN routing forwarding table needs to be separately deployed with a virtual load balancer to provide load balancing services for the carrier's traffic data. If the cloud platform has m tenants and each tenant needs to access n carriers, then m*n virtual load balancers need to be deploy to provide load balancing services. At this time, the number of virtual load balancers is positively related to the number of carriers, resulting in too many virtual load balancers required for the cloud platform, and low resource utilization of the virtual load balancer.

SUMMARY

It is therefore one main object of the present disclosure to provide a method and a system for forwarding data, as well as a virtual load balancer and a readable storage medium, aiming to solve the technical problem in the prior art that the virtual load balancer has a low resource utilization.

To achieve the above object, this disclosure provides a method for forwarding data, the method includes the following operations. When a virtual load balancer VLB receiving a pending response data packet sent by a Linux virtual server LVS from a front terminal sub interface, sending the pending response data packet to a real server RS through a rear terminal sub interface, wherein the forward network port of the VLB corresponds to at least one front terminal sub interface, and one of the front terminal sub interface corresponds to a carrier's data interface. And the RS receiving and responding to the pending response data packet, getting a response data packet and sending the response data packet to the VLB from the rear terminal sub interface. And the VLB receiving the response data packet, transmitting the response data packet to the LVS from the front terminal sub interface that receives the pending response data packet.

In addition, in order to achieve the above object, the present disclosure further provides a system for forwarding data, the system comprising a virtual load balancer VLB, an real server RS, and a Linux virtual server LVS. The VLB is configured to send the pending response data packet to the RS through a rear terminal sub interface when receives a pending response data packet sent by the LVS from a front terminal sub interface, wherein the forward network port of the VLB corresponds to at least one front terminal sub interface, and a front terminal sub interface corresponds to a carrier's data interface. The RS is configured to receive and respond to the pending response data packet, getting a response data packet and sending the response data packet to the VLB from the rear terminal sub interface. The VLB is further configured to receive the response data packet, transmitting the response data packet to the LVS from the front terminal sub interface that receives the pending response data packet.

Further, in order to achieve the foregoing object, the present disclosure further provides a virtual load balancer, the virtual load balancer comprising a memory, a processor, a data forwarding program stored in the memory and performed by the processor, the processor being configured to execute the data forwarding program stored in the memory to perform the following operations. when receiving a pending response data packet sent by a Linux virtual server LVS from a front terminal sub interface, sending the pending response data packet to a real server RS through a rear terminal sub interface, wherein the forward network port of the VLB corresponds to at least one front terminal sub interface, and one of the front terminal sub interface corresponds to a carrier's data interface. Receiving a response data packet from the RS, the RS obtaining the response data packet after receiving and responding to the pending response data packet. Transmitting the response data packet to the LVS from the front terminal sub interface that receives the pending response data packet.

Further, in order to achieve the foregoing object, the present disclosure further provides a computer-readable storage medium that stores one or more programs, which can be executed by one or more processors to perform the following operations. When receiving a pending response data packet sent by a Linux virtual server LVS from a front terminal sub interface, sending the pending response data packet to a real server RS through a rear terminal sub interface, wherein the forward network port of the VLB corresponds to at least one front terminal sub interface, and one of the front terminal sub interface corresponds to a carrier's data interface. Receiving the response data packet from the RS, the RS obtaining the response data packet after receiving and responding to the pending response data packet. Transmitting the response data packet to the LVS from the front terminal sub interface that receives the pending response data packet.

According to this embodiment, the virtual load balancer VLB sending the pending response data packet to the real server RS through a rear terminal sub interface, when the VLB receives a pending response data packet sent by the Linux virtual server LVS from a front terminal sub interface, wherein the forward network port of the VLB corresponds to at least one front terminal sub interface, and a front terminal sub interface corresponds to a carrier's data interface; and the RS receives and responds to the pending response data packet, getting a response data packet and sending the response data packet to the VLB from the rear terminal sub interface; and the VLB receives the response data packet, transmitting the response data packet to the LVS from the front terminal sub interface that receives the pending response data packet. The disclosure realizes that in the cloud platform load balancing process, the number of virtual load balancers is no longer positively correlated with the number of carriers, and the resource utilization rate of the virtual load balancer is improved.

BRIEF DESCRIPTION OF THE ACCOMPANYING DRAWINGS

Various implementations, functional features, and advantages of this disclosure will now be described in further detail in connection with some illustrative embodiments and the accompanying drawings.

DETAILED DESCRIPTION OF ILLUSTRATIVE EMBODIMENTS

It will be appreciated that the specific embodiments described herein are merely illustrative of the disclosure and are not intended to limit the disclosure.

This disclosure provides a method for forwarding data.

Figure 1:
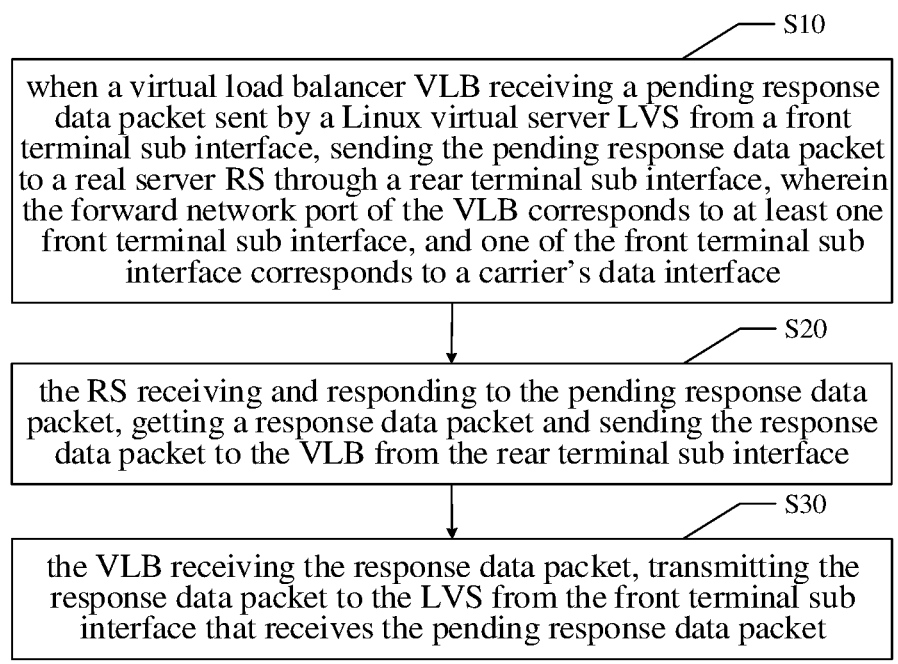
FIG. 1 is an illustrative flowchart of a first embodiment of a method for forwarding data in accordance with this disclosure.

As illustrated in FIG. 1, FIG. 1 is an illustrative flowchart of a first embodiment of a method for forwarding data in accordance with this disclosure.

In this embodiment, an embodiment of a data forwarding method is provided. It should be noted that although the logical order is shown in the flowchart, in some cases, the steps described or illustrated may be performed in a different order than here.

The method includes the following blocks S10 to S30.

In S10, sending the pending response data packet to the real server RS through a rear terminal sub interface, when the virtual load balancer VLB receives a pending response data packet sent by the Linux virtual server LVS from a front terminal sub interface, wherein the forward network port of the VLB corresponds to at least one front terminal sub interface, and a front terminal sub interface corresponds to a carrier's data interface.

When the VLB (Virtual Load Balancer) receives the pending response data packet sent by LVS (Linux Virtual Server, Linux open source load balancing module) from the front terminal sub interface, the VLB send the response packet to the RS (Real Server) from the rear terminal sub interface corresponding to the front terminal sub interface. A front terminal sub interface corresponds to an carrier's data interface, that is, a front terminal sub interface and a first rear terminal sub interface correspond to an carrier's traffic entrance and exit. It can be understood that a forward network port in a VLB, corresponding to a plurality of front terminal sub interfaces; and a backward network port in a VLB, corresponding to a plurality of rear terminal sub interfaces. That is, one forward network port of the VLB corresponds to at least one front terminal sub interface, and the backward network port corresponds to at least one rear terminal sub interface.

In S20, the RS receives and responds to the pending response data packet, getting a response data packet and sending the response data packet to the VLB from the rear terminal sub interface.

In S30, the VLB receives the response data packet, transmitting the response data packet to the LVS from the front terminal sub interface that receives the pending response data packet.

After receiving the pending response data packet by the VLB, the RS obtains the response data packet in response to the pending response data packet, and sends the response data packet to the VLB from the rear terminal sub interface corresponding to the front terminal sub interface. The VLB receives the response packet sent by the RS, and sends the response packet to the LVS from the front terminal sub interface that receives the pending packet.

In this embodiment, if load balancing services are to be provided for m tenants, and each tenant accesses n carriers, only m load balancers are needed, the number of virtual load balancers required is much smaller compared to the existing solution that required m*n virtual load balancers (each carrier of each tenant needs to correspond to a virtual load balancer). In this disclosure, the number of virtual load balancers is no longer positively related to the number of carriers. It can be understood that one tenant can correspond to one virtual load balancer regardless of whether the tenant accesses multiple carriers.

In this embodiment, the VLB is allocated in units of the tenant or load balancing services of the tenant, which simplifies the management logic of the load balancing system.

Further, the block of S10 comprises the following block a to b.

In block a, when the protocol layer of the VLB receives the pending response data packet sent by the LVS from the front terminal sub interface, adding a first identification information to the pending response data packet.

In block b, transmitting the pending response data packet that comprises the first identification information to the application layer of the VLB, for the application layer receives the pending response data packet and delete the first identification information from the pending response data packet, and send the pending response data packet to the RS through the rear terminal sub interface according to a default route.

Further, when the protocol layer of the VLB receives the pending response data packet sent by the LVS from the front terminal sub interface, the first identification information is added to the pending response data packet, and the pending response data packet containing the first identification information is sent to the application layer of the VLB. The application layer of the VLB receives the pending response data packet, deletes the first identification information from the pending response data packet, and sends the pending response data packet to the RS through the rear terminal sub interface corresponding to the front terminal sub interface according to the default route. It should be noted that, in the process of adding the first identification information to the pending response data packet, the parameter corresponding to the first identification information is set. The default route is a special static route, which refers to the choice that the router can make when there is no matching entry between the routing table and the destination address of the packet.

Further, the block of S30 comprises the following block c to d.

In block c, the application layer of the VLB receives the response data packet, and sets a second identification information corresponding to the first identification information according to a preset parameter.

In block d, selecting a routing table according to the second identification information, and sending the response data packet to the LVS from the front terminal sub interface that receives the pending response data packet according to the routing table.

When the application layer of the VLB receives the response packet sent by the RS, the second identification information corresponding to the first identification information is set according to the preset parameter. The application layer of the VLB selects a routing table according to the second identification information, and sends the response data packet to the LVS from the front terminal sub interface that receives the pending response data packet according to the routing table. It should be noted that the preset parameter is a parameter corresponding to the first identification information that is set in the process of adding the first identification information to the pending response data packet. The second identification information corresponding to the first identification information may be set by using a preset parameter. In this embodiment, the second identification information corresponding to the first identification information can be understood as the second identification information being the same as the first identification information, and can also be understood as a mapping relationship between the second identification information and the first identification information.

It should be noted that, in order to prevent the pending response data packet from being changed during the transmission, and in the process of RS responding to the pending response data packet, since the pending response data packet contains the first identification information, thereby obtaining an erroneous response data packet, the first identification information only exists in the protocol stack of the Linux kernel, that is, in the protocol layer of the Linux kernel. When the pending response data packet to the application layer of the VLB, the first identification information will not be carried.

Further, the block of S30 comprises the following block e to f.

In block e, the VLB receives the response data packet, changing a source address and a destination address of the response data packet, and obtaining a modified response data packet.

In block f, transmitting the modified response packet to the LVS from the front terminal sub interface that receives the pending response data packet.

After receiving the response packet, the VLB changes the source address and the destination address of the response packet, obtains the changed response packet, and sends the changed response packet to the LVS from the front terminal sub interface that receives the pending response data packet for the response data packet can be sent in a correct path. Further, the process of the VLB sends the changed response packet to the LVS from the front terminal sub interface that receives the pending response data packet, is specifically sending the changed response data packet according to the second identification information to the LVS from the front terminal sub interface that receives the pending response data packet.

In this embodiment, when the virtual load balancer VLB receives the pending response data packet sent by the Linux virtual server LVS from the front terminal sub interface, the pending response data packet is sent to the real server RS through the rear terminal sub interface, wherein the forward network port of the VLB corresponds to at least one front terminal sub interface, and a front terminal sub interface corresponds to a carrier's data interface; and the RS receives and responds to the pending response data packet, getting a response data packet and sending the response data packet to the VLB from the rear terminal sub interface; and the VLB receives the response data packet, transmitting the response data packet to the LVS from the front terminal sub interface that receives the pending response data packet. The disclosure realizes that in the cloud platform load balancing process, the number of virtual load balancers is no longer positively correlated with the number of carriers, and the resource utilization rate of the virtual load balancer is improved.

Further, a second embodiment of the method for forwarding data is provided herein.

Figure 2:
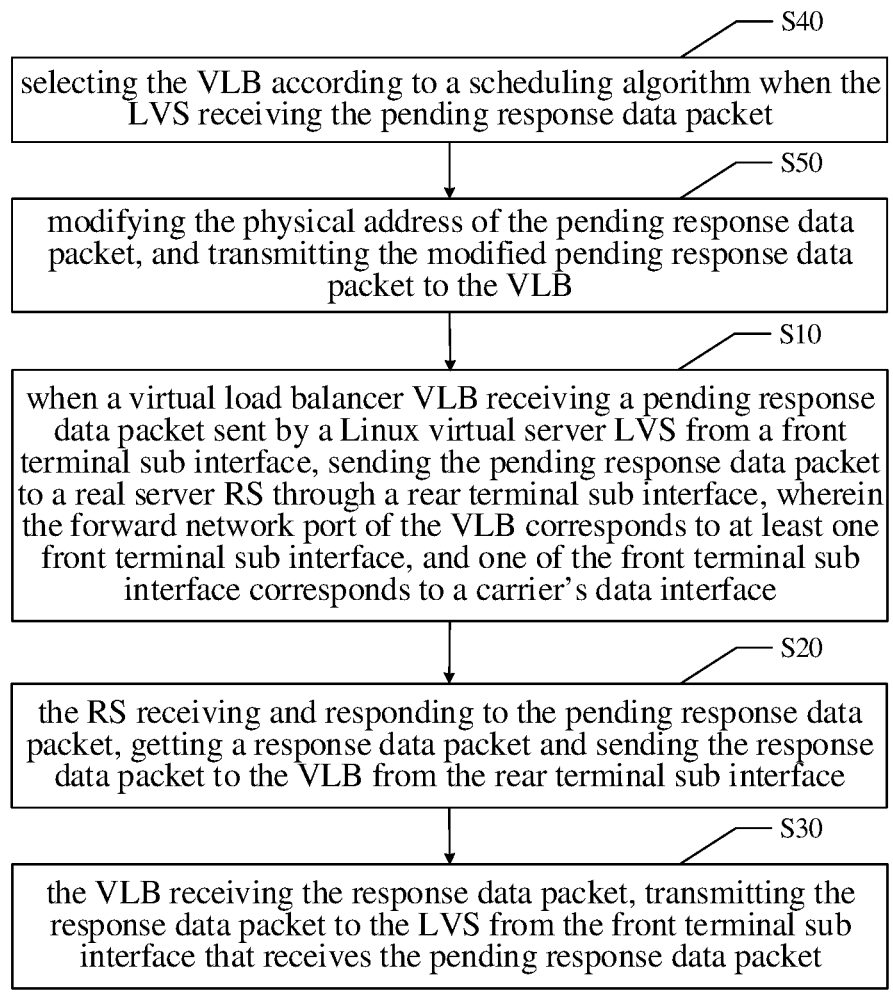
FIG. 2 is an illustrative flowchart of a second embodiment of a method for forwarding data in accordance with this disclosure.

As illustrated in FIG. 2, the difference between the second embodiment and the first embodiment of the data forwarding method is that the data forwarding method further includes the following block S40 to S50.

In S40, selecting the VLB according to a scheduling algorithm when the LVS receives the pending response data packet.

In S50, modifying the physical address of the pending response data packet, and transmitting the modified pending response data packet to the VLB.

When the LVS receives the pending response data packet, selecting the VLB according to the scheduling algorithm. Specifically, the pending response data packet is received by IPVS (IP Virtual Server) in the LVS. When the LVS receives the pending response data packet, the physical address of the pending response data packet is modified, and the modified pending response data packet is sent to the selected VLB. In this embodiment, the LVS modifies the MAC (Medium Access Control) address of the VLB to the MAC address of the pending data by means of DR (Direct Routing), so that the VLB can receive the pending response data packet.

Further, the data forwarding method further includes the following block g to h.

In block g, converting the destination address of the pending response data packet into a destination address in preset form when the firewall receives the pending response data packet sent by a client, and sending the pending response data packet to a switch after the destination address of it is converted.

In block h, the switch receives the pending response data packet, selecting an equivalent route according to scheduling algorithm, and sending the pending response data packet to the LVS.

Further, when the firewall receives the pending response data packet sent by the client, the destination address of the pending response data packet is converted into a destination address in a preset form, and the pending response data packet after the destination address is translated is sent to the switch. When the switch receives the pending response data packet, it selects an equivalent route according to the scheduling algorithm, and sends the pending response data packet to the LVS. Specifically, the destination address of the pending response data packet is converted into a destination address in the form of vip:vport by DNAT (Destination Network Address Translation).

In this embodiment, the scheduling algorithm includes a static scheduling algorithm and a dynamic scheduling algorithm, and the dynamic scheduling algorithm includes but is not limited to an LC (Least-Connection) algorithm and an LBLC (Locality-Based Least Connection) algorithms, static scheduling algorithms includes but are not limited to Dh (Destination hashing) algorithm, sh(source hashing) algorithm, and RR (Round Robin) algorithm.

The principle of the polling scheduling algorithm is that each time the request from the user is assigned to the internal server in turn, starting from 1 until N (the number of internal servers), and then restarting the loop. The source address hash scheduling algorithm is based on the source IP address (Internet Protocol) of the request, and is used as a hash key to find a corresponding server from a statically allocated hash table, if the server is available and there is no overload, the request is sent to the server, otherwise it returns null. The target address hash scheduling algorithm is a static mapping algorithm that maps a destination IP address to a server through a hash function. The least connection scheduling algorithm estimates the load balancing of the server by the currently active connections number of the server. The scheduler needs to record the number of connections established by each server. When a request is dispatched to a server, the number of connections is increased by one, when the request abort or timeout, the number of connections is reduced by one. When the system is implementing, we also introduce that when the server's weight is 0, it means that the server is unavailable and not scheduled. The locality-based least connection algorithm is load balancing scheduling for the destination IP address of the request message.

In this embodiment, when the LVS receives the pending response data packet, the VLB is selected according to the scheduling algorithm, so that the LVS sends the pending response data packet to the VLB with a smaller current load.

It should be noted that those skilled in the art may understand that all or part of the steps of implementing the above embodiments may be completed by hardware, or may be instructed by a program to execute related hardware, and the program may be stored in a computer readable storage medium, the storage medium mentioned above may be a read only memory, a magnetic disk or an optical disk, or the like.

In this disclosure, further provides a data forwarding system.

Figure 3:
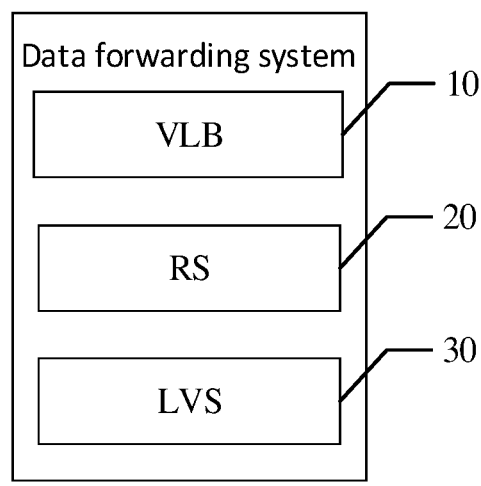
FIG. 3 is a schematic diagram of functional modules of a preferred embodiment of a system for forwarding data in accordance with this disclosure.

As illustrated in FIG. 3, FIG. 3 is a schematic diagram of functional modules of a preferred embodiment of a system for forwarding data in accordance with this disclosure.

It should be emphasized that, for those skilled in the art, the block diagram shown in FIG. 3 is merely an exemplary diagram of a preferred embodiment, and those skilled in the art can easily supplement the new module of the data forwarding system shown in FIG. 3. The name of each module is a custom name, which is only used to assist in understanding the various program function blocks of the data forwarding system, and is not used to define the technical solution of the present disclosure. The core of the technical solution of the present invention is the function to be achieved by each custom name module.

In this embodiment, the data forwarding system includes a virtual load balancer VLB10, a real server RS20, and a Linux virtual server LVS30.

The VLB 10 is configured to send the pending response data packet to the RS20 through a rear terminal sub interface when receiving the pending response data packet sent by the LVS 30 from the front terminal sub interface, wherein one front terminal sub interface corresponds to a carrier's data interface.

When the VLB10 (Virtual Load Balancer) receives the pending packet sent by LVS30 (Linux Virtual Server, Linux open source load balancing module) from the front terminal sub interface, sending the pending packet to the RS20 (Real Server, real server) from the rear terminal sub interface corresponding to the front terminal sub interface. Wherein a front terminal sub interface corresponds to a carrier's data interface, that is, a front terminal sub interface and a first rear terminal sub interface correspond to an operator's traffic entrance and exit. It can be understood that a forward network port in a VLB10, corresponding to a plurality of front terminal sub interfaces; and a backward network port in a VLB10, corresponding to a plurality of rear terminal sub interfaces.

The RS20 is configured to receive and respond to the pending response data packet, obtain a response data packet, and send the response data packet from the back terminal interface to the VLB10.

The VLB10 is further configured to receive the response data packet, transmitting the response data packet to the LVS30 from the front terminal sub interface that receives the pending response data packet.

After receiving the pending response data packet sent by the VLB10, the RS20 obtains the response data packet in response to the pending response data packet, and sends the response data packet to the VLB10 from the rear terminal sub interface corresponding to the front terminal sub interface. The VLB10 receives the response packet sent by the RS20, and sends the response packet to the LVS from the front terminal sub interface that receives the pending packet.

In this embodiment, if load balancing services are to be provided for m tenants, and each tenant accesses n carriers, only m load balancers are needed, the number of virtual load balancers required is much smaller compared to the existing solution that required m*n virtual load balancers (each carrier of each tenant needs to correspond to a virtual load balancer). In this disclosure, the number of virtual load balancers is no longer positively related to the number of carriers. It can be understood that one tenant can correspond to one virtual load balancer regardless of whether the tenant accesses multiple carriers. That is, a forward network port of the VLB corresponds to at least one front terminal sub interface, the backward network port corresponds to at least one rear terminal sub interface.

In this embodiment, the VLB is allocated in units of the tenant or load balancing services of the tenant, which simplifies the management logic of the load balancing system.

Further, the VLB10 comprising:

Adding module, being configured to add the first identification information to the pending response data packet when the protocol layer receives the pending response data packet sent by the LVS30 from the front terminal sub interface.

Sending module, being configured to send the pending response data packet that includes the first identification information to the application layer of the VLB, for the application layer to receive the pending response data packet, deleting the first identification information from the pending response data packet, and transmitting the pending response data packet to the RS20 through the rear terminal sub interface according to the default route.

Further, when the protocol layer of the VLB10 receives the pending response data packet sent by the LVS30 from the front terminal sub interface, adding the first identification information to the pending response data packet, and sending the pending response data packet containing the first identification information to the application layer of the VLB10. The application layer of the VLB 10 receives the pending response data packet, deletes the first identification information from the pending response data packet, and sends the pending response data packet to the RS20 through the back terminal interface corresponding to the front terminal sub interface according to the default route. It should be noted that, in the process of adding the first identification information to the pending response data packet, the parameter corresponding to the first identification information is set. The default route is a special type of static route, which refers to the choice that the router can make when there is no matching entry between the routing table and the destination address of the packet.

Receiving module, being configured to receive the response data packet.

Setting module, being configured to set a second identification information corresponding to the first identification information according to a preset parameter, and the second identification information is used as an identification information of the response data packet.

Selecting module, being configured to select a routing table according to the second identification information.

The sending module is further configured to send the response data packet to the LVS30 from the front terminal sub interface that receives the pending response data packet according to the routing table.

When the application layer of the VLB10 receives the response packet sent by the RS20, the second identification information corresponding to the first identification information is set according to the preset parameter. The application layer of the VLB10 selects a routing table according to the second identification information, and sends the response data packet to the LVS30 from the front terminal sub interface that receives the pending response data packet according to the routing table. It should be noted that the preset parameter is a parameter corresponding to the first identification information that is set in the process of adding the first identification information to the pending response data packet. The second identification information corresponding to the first identification information may be set by using a preset parameter. In this embodiment, the second identification information corresponding to the first identification information can be understood as the second identification information being the same as the first identification information, and can also be understood as a mapping relationship between the second identification information and the first identification information.

It should be noted that, in order to prevent the pending response data packet from being changed during the transmission, and in the process of RS responding to the pending response data packet, since the pending response data packet contains the first identification information, thereby obtaining an erroneous response data packet, the first identification information only exists in the protocol stack of the Linux kernel, that is, in the protocol layer of the Linux kernel. When the pending response data packet to the application layer of the VLB10, the first identification information will not be carried.

Further, the VLB10 is further configured to receive the response data packet, changing the source address and the destination address of the response packet, obtains the changed response packet, and sends the changed response packet to the LVS30 from the front terminal sub interface that receives the pending response data packet.

After receiving the response data packet, the VLB10 changes the source address and the destination address of the response data packet, obtains the changed response data packet, and sends the changed response data packet from the front terminal sub interface of the data packet to be received to the LVS30 for the response data packet can be sent in a correct path. Further, the process of the VLB10 sends the changed response packet to the LVS30 from the front terminal sub interface that receives the pending response data packet, is specifically sending the changed response data packet according to the second identification information to the LVS30 from the front terminal sub interface that receives the pending response data packet.

In this embodiment, when the virtual load balancer VLB10 receives the pending response data packet sent by the Linux virtual server LVS30 from the front terminal sub interface, the pending response data packet is sent to the real server RS20 through the rear terminal sub interface, wherein the forward network port of the VLB corresponds to at least one front terminal sub interface, and a front terminal sub interface corresponds to a carrier's data interface; and the RS20 receives and responds to the pending response data packet, getting a response data packet and sending the response data packet to the VLB10 from the rear terminal sub interface; and the VLB10 receives the response data packet, transmitting the response data packet to the LVS30 from the front terminal sub interface that receives the pending response data packet. The disclosure realizes that in the cloud platform load balancing process, the number of virtual load balancers is no longer positively correlated with the number of carriers, and the resource utilization rate of the virtual load balancer is improved.

Further, a second embodiment of the system for forwarding data is provided herein.

The second embodiment of the data forwarding system is different from the first embodiment in that the LVS30 is further configured to selecting the VLB10 according to a scheduling algorithm when receiving the pending response data packet; modifying the physical address of the pending response data packet, and transmitting the modified pending response data packet to the VLB10.

When the LVS30 receives the pending response data packet, selecting the VLB10 according to the scheduling algorithm. Specifically, the pending response data packet is received by IPVS (IP Virtual Server) in the LVS30. When the LVS30 receives the pending response data packet, the physical address of the pending response data packet is modified, and the modified pending response data packet is sent to the selected VLB10. In this embodiment, the LVS30 modifies the MAC (Medium Access Control) address of the VLB10 to the MAC address of the pending data by means of DR (Direct Routing), so that the VLB10 can receive the pending response data packet.

Further, the data forwarding system further comprising a switch and a firewall.

The firewall is configured to convert the destination address of the pending response data packet to a destination address in a preset form when receives the pending response data packet sent by the client, and send the pending response data packet to the switch after converting the destination address The switch is configured to receive the pending response data packet, selecting an equivalent route according to the scheduling algorithm, and send the pending response data packet to the LVS30.

Further, when the firewall receives the pending response data packet sent by the client, the destination address of the pending response data packet is converted into a destination address in a preset form, and the pending response data packet after the destination address is translated is sent to the switch. When the switch receives the pending response data packet, it selects an equivalent route according to the scheduling algorithm, and sends the pending response data packet to the LVS30. Specifically, the destination address of the pending response data packet is converted into a destination address in the form of vip:vport by DNAT (Destination Network Address Translation).

In this embodiment, the scheduling algorithm includes a static scheduling algorithm and a dynamic scheduling algorithm, and the dynamic scheduling algorithm includes but is not limited to an LC (Least-Connection) algorithm and an LBLC (Locality-Based Least Connection) algorithms, static scheduling algorithms includes but are not limited to Dh (Destination hashing) algorithm, sh(source hashing) algorithm, and RR (Round Robin) algorithm.

The principle of the polling scheduling algorithm is that each time the request from the user is assigned to the internal server in turn, starting from 1 until N (the number of internal servers), and then restarting the loop. The source address hash scheduling algorithm is based on the source IP address (Internet Protocol) of the request, and is used as a hash key to find a corresponding server from a statically allocated hash table, if the server is available and there is no overload, the request is sent to the server, otherwise it returns null. The target address hash scheduling algorithm is a static mapping algorithm that maps a destination IP address to a server through a hash function. The least connection scheduling algorithm estimates the load balancing of the server by the currently active connections number of the server. The scheduler needs to record the number of connections established by each server. When a request is dispatched to a server, the number of connections is increased by one, when the request abort or timeout, the number of connections is reduced by one. When the system is implementing, we also introduce that when the server's weight is 0, it means that the server is unavailable and not scheduled. The locality-based least connection algorithm is load balancing scheduling for the destination IP address of the request message.

In this embodiment, when the LVS30 receives the pending response data packet, the VLB10 is selected according to the scheduling algorithm, so that the LVS30 sends the pending response data packet to the VLB10 with a smaller current load.

Figure 4:
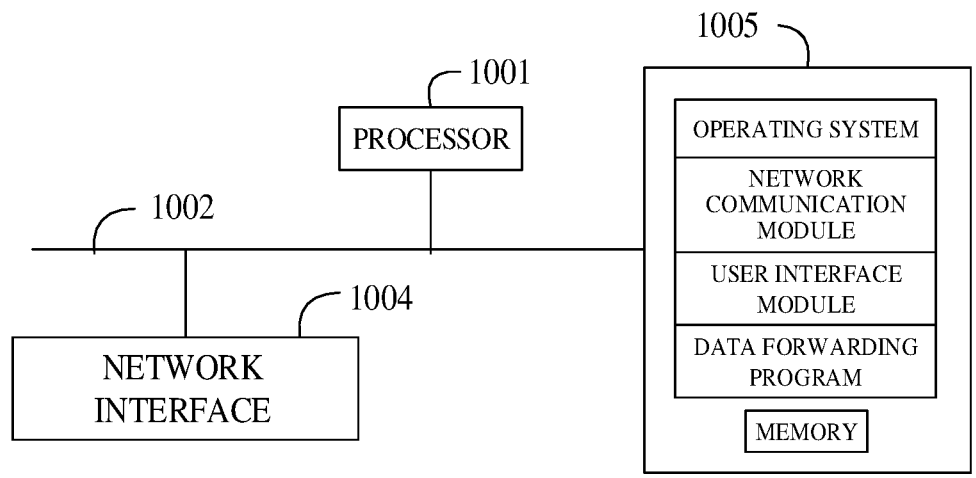
FIG. 4 is a schematic diagram of a device in terms of hard operating environment involved in the method embodiments in accordance with this disclosure.

As illustrated in FIG. 4, FIG. 4 is a schematic diagram of a device in terms of hard operating environment involved in the method embodiments in accordance with this disclosure.

It should be noted that FIG. 4 could be a schematic structural diagram of a hardware running environment of a virtual load balancer. The virtual load balancer may include a processor 1001 such as a CPU, a network interface 1004, a memory 1005, and a communication bus 1002. The communication bus 1002 is configured to facilitate connection and communication between these components. The network interface 1004 can optionally include a standard wired interface and a wireless interface (such as a WI-FI interface). The memory 1005 may be a high-speed RAM memory, or a non-volatile memory such as a disk memory. The memory 1005 optionally may also be a storage device that is separate from the processor 1001 described above.

Optionally, the virtual load balancer may further include a user interface, a network interface, a camera, an RF (Radio Frequency) circuitry, a sensor, an audio circuitry, a Wi-Fi module, and the like.

Those skilled in the art can understand that the structure of the virtual load balancer illustrated in FIG. 4 does not constitute a limitation on the virtual load balancer. Thus, the virtual load balancer may include more or less components than those illustrated, or some components may be combined, or different arrangements of components may be employed.

As illustrated in FIG. 4, the memory 1005 as a computer storage medium may include an operating system, a network communication module, and a data forwarding program. The operating system is a program that manages and controls the hardware and software resources of the virtual load balancer, and supports the operation of the data forwarding program and other software and/or programs.

In the schematic diagram of the virtual load balancer shown in FIG. 4, the network interface 1004 can be used to connect the LVS and the RS, and perform data communication with the LVS and the RS. The processor 1001 can be used to call a data forwarding program stored in the memory 1005 and perform the following operations.

Sending the pending response data packet to the real server RS through a rear terminal sub interface, when the virtual load balancer VLB receives a pending response data packet sent by the Linux virtual server LVS from a front terminal sub interface, wherein the forward network port of the VLB corresponds to at least one front terminal sub interface, and a front terminal sub interface corresponds to a carrier's data interface. The RS receives and responds to the pending response data packet, getting a response data packet and sending the response data packet to the VLB from the rear terminal sub interface; The VLB receives the response data packet, transmitting the response data packet to the LVS from the front terminal sub interface that receives the pending response data packet.

The virtual load balancer further comprising a protocol layer and an application layer, wherein the block of sending the pending response data packet to the RS through a rear terminal sub interface when receiving a pending response data packet sent by the LVS from a front terminal sub interface comprises the following operations. Adding the first identification information to the pending response data packet when receiving the pending response data packet sent by the LVS from the front terminal sub interface through the protocol layer. Transmitting the pending response data packet that comprises the first identification information to the application layer, for the application layer to receive the pending response data packet and delete the first identification information from the pending response data packet, sending the pending response data packet to the RS through the rear terminal sub interface according to the default route. The block of transmitting the response data packet to the LVS from the front terminal sub interface that receives the pending response data packet comprises the following operations. In the application layer, setting a second identification information corresponding to the first identification information according to a preset parameter. Selecting a routing table according to the second identification information, and sending the response data packet to the LVS from the front terminal sub interface that receives the pending response data packet according to the routing table.

Further, the block of transmitting the response data packet to the LVS from the front terminal sub interface that receives the pending response data packet comprises the following operations. Changing the source address and the destination address of the response data packet, and obtaining a modified response data packet. Transmitting the modified response packet to the LVS from the front terminal sub interface that receives the pending response data packet.

Further, prior to the block of sending the pending response data packet to the RS through a rear terminal sub interface when receiving a pending response data packet sent by the LVS from a front terminal sub interface, the processor is further configured to execute the data forwarding program stored in the memory to perform the following operations. Receiving the pending response data packet after the physical address is modified by the LVS.

The embodiment of the virtual load balancer in this embodiment is basically the same as the foregoing embodiment of the data forwarding method and system, and details are not described herein again.

The present disclosure provides a computer-readable storage medium storing one or more programs which can be executed by one or more processors to perform the following operations.

Sending the pending response data packet to the real server RS through a rear terminal sub interface, when the virtual load balancer VLB receives a pending response data packet sent by the Linux virtual server LVS from a front terminal sub interface, wherein the forward network port of the VLB corresponds to at least one front terminal sub interface, and a front terminal sub interface corresponds to a carrier's data interface. The RS receives and responds to the pending response data packet, getting a response data packet and sending the response data packet to the VLB from the rear terminal sub interface; The VLB receives the response data packet, transmitting the response data packet to the LVS from the front terminal sub interface that receives the pending response data packet.

The virtual load balancer further comprising a protocol layer and an application layer, wherein the block of sending the pending response data packet to the RS through a rear terminal sub interface when receiving a pending response data packet sent by the LVS from a front terminal sub interface comprises the following operations. Adding the first identification information to the pending response data packet when receiving the pending response data packet sent by the LVS from the front terminal sub interface through the protocol layer. Transmitting the pending response data packet that comprises the first identification information to the application layer, for the application layer to receive the pending response data packet and delete the first identification information from the pending response data packet, sending the pending response data packet to the RS through the rear terminal sub interface according to the default route. The block of transmitting the response data packet to the LVS from the front terminal sub interface that receives the pending response data packet comprises the following operations. In the application layer, setting a second identification information corresponding to the first identification information according to a preset parameter. Selecting a routing table according to the second identification information, and sending the response data packet to the LVS from the front terminal sub interface that receives the pending response data packet according to the routing table.

Further, the block of transmitting the response data packet to the LVS from the front terminal sub interface that receives the pending response data packet comprises the following operations. Changing the source address and the destination address of the response data packet, and obtaining a modified response data packet. Transmitting the modified response packet to the LVS from the front terminal sub interface that receives the pending response data packet.

Further, prior to the block of sending the pending response data packet to the RS through a rear terminal sub interface when receiving a pending response data packet sent by the LVS from a front terminal sub interface, the processor is further configured to execute the data forwarding program stored in the memory to perform the following operations. Receiving the pending response data packet after the physical address is modified by the LVS.

The embodiment of the computer readable storage medium of the embodiment is basically the same as the foregoing embodiment of the data forwarding method and system, and details are not described herein again.

Also need to explain that as used herein, the terms "including," "comprising," or any other variants thereof are intended to encompass a non-exclusive inclusion, so that processes, methods, articles, or systems that include a series of elements will include not only those elements, but also other elements as well that haven't been explicitly listed or those elements inherent in such processes, methods, articles, or systems. In the absence of further restrictions, the element defined by the phrase "including/comprising a . . . " will not preclude the existence of additional such elements in the processes, methods, articles, or systems that include the element.

The above numbering of embodiments is intended for illustrative purposes only, and is not indicative of the pros and cons of these embodiments.

By the above description of embodiments, it will be evident to those of skill art that the methods according to the above embodiments can be implemented by means of software plus the necessary general-purpose hardware platform; they can of course be implemented by hardware, but in many cases the former will be more advantageous. Based on such an understanding, the essential technical solution of the disclosure, or the portion that contributes to the prior art may be embodied as software products. Computer software products can be stored in a storage medium (e.g., a ROM/RAM, a magnetic disk, an optical disk) and may include multiple instructions that, when executed, can cause a computing device (e.g., a mobile phone, a computer, a server, a network device, etc.), to execute the methods as described in the various embodiments of the disclosure.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A method for forwarding data, comprising:
   when a virtual load balancer VLB receiving a pending response data packet sent by a Linux virtual server LVS from a front terminal sub interface, sending the pending response data packet to a real server RS through a rear terminal sub interface, wherein the forward network port of the VLB corresponds to at least one front terminal sub interface, and one of the front terminal sub interface corresponds to a carrier's data interface; and
   the RS receiving and responding to the pending response data packet, getting a response data packet and sending the response data packet to the VLB from the rear terminal sub interface; and
   the VLB receiving the response data packet, transmitting the response data packet to the LVS from the front terminal sub interface that receives the pending response data packet;
   wherein the block of when a VLB receiving a pending response data packet sent by a LVS from a front terminal sub interface, sending the pending response data packet to a RS through a rear terminal sub interface comprises:
   when the protocol layer of the VLB receives the pending response data packet sent by the LVS from the front terminal sub interface, adding a first identification information to the pending response data packet; and
   transmitting the pending response data packet that comprises the first identification information to the application layer of the VLB, for the application layer to receive the pending response data packet and delete the first identification information from the pending response data packet, and send the pending response data packet to the RS through the rear terminal sub interface according to a default route;

the block of the VLB receiving the response data packet, transmitting the response data packet to the LVS from the front terminal sub interface that receives the pending response data packet comprises:

the application layer of the VLB receiving the response data packet, and setting a second identification information corresponding to the first identification information according to a preset parameter; and selecting a routing table according to the second identification information, and sending the response data packet to the LVS from the front terminal sub interface that receives the pending response data packet according to the routing table.

2. The method of claim 1, wherein the block of the VLB receiving the response data packet, transmitting the response data packet to the LVS from the front terminal sub interface that receiving the pending response data packet comprises:

the VLB receiving the response data packet, changing a source address and a destination address of the response data packet, and obtaining a modified response data packet; and transmitting the modified response packet to the LVS from the front terminal sub interface that receives the pending response data packet.

3. The method of claim 1, further comprising, prior to the block of when a VLB receiving a pending response data packet sent by a LVS from a front terminal sub interface, sending the pending response data packet to a RS through a rear terminal sub interface:

selecting the VLB according to a scheduling algorithm when the LVS receiving the pending response data packet; and modifying the physical address of the pending response data packet, and transmitting the modified pending response data packet to the VLB.

4. The method of claim 3, further comprising, prior to the block of selecting the VLB according to a scheduling algorithm when the LVS receiving the pending response data packet:

converting the destination address of the pending response data packet into a destination address in preset form when a firewall receives the pending response data packet sent by a client, and sending the pending response data packet with the destination address converted to a switch; and the switch receiving the pending response data packet, selecting an equivalent route according to scheduling algorithm, and sending the pending response data packet to the LVS.

5. The method of claim 1, further comprising, prior to the block of when a VLB receiving a pending response data packet sent by a LVS from a front terminal sub interface, sending the pending response data packet to a RS through a rear terminal sub interface:

selecting the VLB according to a scheduling algorithm when the LVS receiving the pending response data packet; and modifying the physical address of the pending response data packet, and transmitting the modified pending response data packet to the VLB.

6. The method of claim 5, further comprising, prior to the block of selecting the VLB according to a scheduling algorithm when the LVS receiving the pending response data packet:

converting the destination address of the pending response data packet into a destination address of a preset form when the firewall receives the pending response data packet sent by a client, and sending the pending response data packet with the destination address converted to a switch; and the switch receiving the pending response data packet, selecting an equivalent route according to scheduling algorithm, and sending the pending response data packet to the LVS.

7. A virtual load balancer, the virtual load balancer comprising a memory, a processor, a data forwarding program stored in the memory and performed by the processor, the processor being configured to execute the data forwarding program stored in the memory to perform the following operations:

when receiving a pending response data packet sent by a Linux virtual server LVS from a front terminal sub interface, sending the pending response data packet to a real server RS through a rear terminal sub interface, wherein the forward network port of the VLB corresponds to at least one front terminal sub interface, and one of the front terminal sub interface corresponds to a carrier's data interface; and;

receiving a response data packet from the RS, the RS obtaining the response data packet after receiving and responding to the pending response data packet; and transmitting the response data packet to the LVS from the front terminal sub interface that receives the pending response data packet;

the virtual load balancer further comprising a protocol layer and an application layer, wherein the block of when receiving a pending response data packet sent by a LVS from a front terminal sub interface, sending the pending response data packet to a RS through a rear terminal sub interface comprises:

adding a first identification information to the pending response data packet when the pending response data packet sent by the LVS is received from the front terminal sub interface through the protocol layer;

transmitting the pending response data packet that comprises the first identification information to the application layer, for the application layer to receive the pending response data packet and delete the first identification information from the pending response data packet, and send the pending response data packet to the RS through the rear terminal sub interface according to a default route;

the block of transmitting the response data packet to the LVS from the front terminal sub interface that receives the pending response data packet comprises:

in the application layer, setting a second identification information corresponding to the first identification information according to a preset parameter;

selecting a routing table according to the second identification information, and sending the response data packet to the LVS from the front terminal sub interface that receives the pending response data packet according to the routing table.

8. The virtual load balancer of claim 7, wherein the block of transmitting the response data packet to the LVS from the front terminal sub interface that receives the pending response data packet comprises:

changing the source address and the destination address of the response data packet, and obtaining a modified response data packet; and transmitting the modified response packet to the LVS from the front terminal sub interface that receives the pending response data packet.

9. The virtual load balancer of claim 7, wherein prior to the block of when receiving a pending response data packet sent by a LVS from a front terminal sub interface, sending the pending response data packet to a RS through a rear terminal sub interface, the processor is further configured to execute the data forwarding program stored in the memory to perform the following operations:

receiving the pending response data packet after the physical address is modified by the LVS.

10. A non-transitory computer-readable storage medium that stores one or more programs, which can be executed by one or more processors to perform the following operations:

when receiving a pending response data packet sent by a Linux virtual server LVS from a front terminal sub interface, sending the pending response data packet to a real server RS through a rear terminal sub interface, wherein the forward network port of the VLB corresponds to at least one front terminal sub interface, and one of the front terminal sub interface corresponds to a carrier's data interface; and receiving the response data packet from the RS, the RS obtaining the response data packet after receiving and responding to the pending response data packet; and transmitting the response data packet to the LVS from the front terminal sub interface that receives the pending response data packet;

wherein the block of when receiving a pending response data packet sent by a LVS from a front terminal sub interface, sending the pending response data packet to a RS through a rear terminal sub interface comprises:

adding a first identification information to the pending response data packet when the pending response data packet sent by the LVS is received from the front terminal sub interface through the protocol layer; and transmitting the pending response data packet that comprises the first identification information to the application layer, for the application layer to receive the pending response data packet and delete the first identification information from the pending response data packet, and send the pending response data packet to the RS through the rear terminal sub interface according to a default route;

the block of transmitting the response data packet to the LVS from the front terminal sub interface that receives the pending response data packet comprises:

in the application layer, setting a second identification information corresponding to the first identification information according to a preset parameter;

selecting a routing table according to the second identification information, and sending the response data packet to the LVS from the front terminal sub interface that receives the pending response data packet according to the routing table.

11. The non-transitory computer-readable storage medium of claim 10, wherein the block of transmitting the response data packet to the LVS from the front terminal sub interface that receives the pending response data packet comprises:

changing the source address and the destination address of the response data packet, and obtaining a modified response data packet; and transmitting the modified response packet to the LVS from the front terminal sub interface that receives the pending response data packet.

12. The non-transitory computer-readable storage medium of claim 10, wherein prior to the block of when receiving a pending response data packet sent by a LVS from a front terminal sub interface, sending the pending response data packet to a RS through a rear terminal sub interface, the one or more programs can be executed by the one or more processors to further perform the following operations:

receiving the pending response data packet after the physical address is modified by the LVS.

* * * * *